US010412095B2

(12) United States Patent
Viswanath et al.

(10) Patent No.: US 10,412,095 B2
(45) Date of Patent: Sep. 10, 2019

(54) METHOD, APPARATUS, AND COMPUTER PROGRAM PRODUCT FOR MANAGING ACCESS PERMISSIONS FOR A SEARCHABLE ENTERPRISE PLATFORM

(71) Applicant: ATLASSIAN PTY LTD, Sydney (AU)

(72) Inventors: Sri Viswanath, Palo Alto, CA (US); Stephen Deasy, Mountain View, CA (US); Gene Drabkin, Los Gatos, CA (US); Marc Andrew Reisen, San Francisco, CA (US); Orpheus Mall, San Francisco, CA (US); Jon Hartlaub, Mountain View, CA (US)

(73) Assignee: ATLASSIAN PTY LTD, Sydney (AU)

( * ) Notice: Subject to any disclaimer, the term of this patent is extended or adjusted under 35 U.S.C. 154(b) by 290 days.

(21) Appl. No.: 15/633,598

(22) Filed: Jun. 26, 2017

(65) Prior Publication Data
US 2018/0183801 A1 Jun. 28, 2018

Related U.S. Application Data

(60) Provisional application No. 62/437,978, filed on Dec. 22, 2016.

(51) Int. Cl.
*G06F 21/62* (2013.01)
*H04L 29/06* (2006.01)
*H04L 9/32* (2006.01)

(52) U.S. Cl.
CPC ............ *H04L 63/102* (2013.01); *G06F 21/62* (2013.01); *G06F 21/6218* (2013.01); *H04L 63/101* (2013.01); *G06F 2221/2117* (2013.01); *G06F 2221/2141* (2013.01); *H04L 9/32* (2013.01); *H04L 63/10* (2013.01)

(58) Field of Classification Search
CPC .................................................. H04L 63/102
See application file for complete search history.

(56) References Cited

U.S. PATENT DOCUMENTS 7,185,192 B1 * 2/2007 Kahn .................. G06F 21/6218
707/999.003
10,122,757 B1 * 11/2018 Kruse ..................... H04L 63/10
(Continued)

*Primary Examiner* — Ponnoreay Pich
(74) *Attorney, Agent, or Firm* — Hickman Palermo Becker Bingham LLP

(57) ABSTRACT

Embodiments of the present invention provide methods, systems, apparatuses, and computer program products for managing access permissions for a searchable enterprise platform. In one embodiment, an apparatus is configured to receive a search request from a client device associated with a user profile; retrieve a global content permissions profile, the global content permissions profile comprising content access permissions assigned to digital content items that are retrievable by one or more of the plurality of software applications; apply permissions conflict rules to resolve permissions conflicts between the global permissions profile and the global content permissions profile to produce a resolved permissions profile; retrieve search results comprising a preliminary digital content item set that is associated with the plurality of software applications; apply the resolved permissions profile to the search results to produce a user-permitted digital content item set; and output the user-permitted digital content set to the client device associated with the user profile.

19 Claims, 10 Drawing Sheets

(56) References Cited

U.S. PATENT DOCUMENTS

| | | | | |
|---|---|---|---|---|
| 2004/0133793 | A1* | 7/2004 | Ginter | G06F 21/10 |
| | | | | 713/193 |
| 2005/0138179 | A1* | 6/2005 | Encarnacion | H04L 63/10 |
| | | | | 709/227 |
| 2008/0263103 | A1* | 10/2008 | McGregor | G06F 21/6218 |
| 2009/0259738 | A1* | 10/2009 | Zimmermann | H04L 63/101 |
| | | | | 709/221 |
| 2009/0300712 | A1* | 12/2009 | Kaufmann | G06F 21/10 |
| | | | | 726/1 |
| 2012/0185435 | A1* | 7/2012 | Misra | G06F 16/1873 |
| | | | | 707/638 |

* cited by examiner

METHOD, APPARATUS, AND COMPUTER PROGRAM PRODUCT FOR MANAGING ACCESS PERMISSIONS FOR A SEARCHABLE ENTERPRISE PLATFORM

CROSS REFERENCE TO RELATED APPLICATIONS

The present application claims priority to U.S. Provisional Patent Application Ser. No. 62/437,978, titled "METHODS, APPARATUS, AND COMPUTER PROGRAM PRODUCT FOR MANAGING ACCESS PERMISSIONS FOR A SEARCHABLE ENTERPRISE PLATFORM" and filed Dec. 22, 2016, the contents of which are incorporated herein by reference in their entirety.

BACKGROUND

An enterprise platform may support several distinct software applications. Applicant has identified a number of deficiencies and problems associated with searching across an enterprise platform, including problems associated with managing content access rights. Through applied effort, ingenuity, and innovation, many of these identified problems have been solved by developing solutions that are included in embodiments of the present invention, many examples of which are described in detail herein.

BRIEF SUMMARY

This specification relates to managing access permissions for a searchable enterprise platform. In one embodiment, a computing entity or apparatus is configured to receive a search request from a client device associated with a user profile; retrieve a global permissions profile associated with the user profile, the global permissions profile comprising application access permissions assigned to the user profile for the plurality of software applications. The apparatus is further configured to retrieve a global content permissions profile, the global content permissions profile comprising content access permissions assigned to digital content items that are retrievable by one or more of the plurality of software applications; apply permissions conflict rules to resolve permissions conflicts between the global permissions profile and the global content permissions profile to produce a resolved permissions profile; retrieve search results comprising a preliminary digital content item set that is associated with the plurality of software applications; apply the resolved permissions profile to the search results to produce a user-permitted digital content item set; and output the user-permitted digital content set to the client device associated with the user profile.

Other embodiments include corresponding systems, methods, and computer programs, configured to perform the operations of the apparatus, encoded on computer storage devices. These and other embodiments can each optionally include one or more of the following features: applying relevance weights to each digital content item of the user-permitted digital content item set, the relevance weights based on the resolved permissions profile; ranking each digital content item of the user-permitted digital content item set according to the applied relevance weights; and arranging the user-permitted digital content item set according to the ranking.

Other embodiments can each optionally include one or more of arranging the user permitted digital content item set for display at the client device according to a digital content item creation timestamp in relation to a defined network time. The user permitted digital content item set can further be arranged for display at the client device according to a digital content item occurrence frequency associated with a software application. The user permitted digital content item set can further be arranged for display at the client device according to arrangement by relevance or a scoring algorithm (e.g., to provide most interesting results at the top).

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
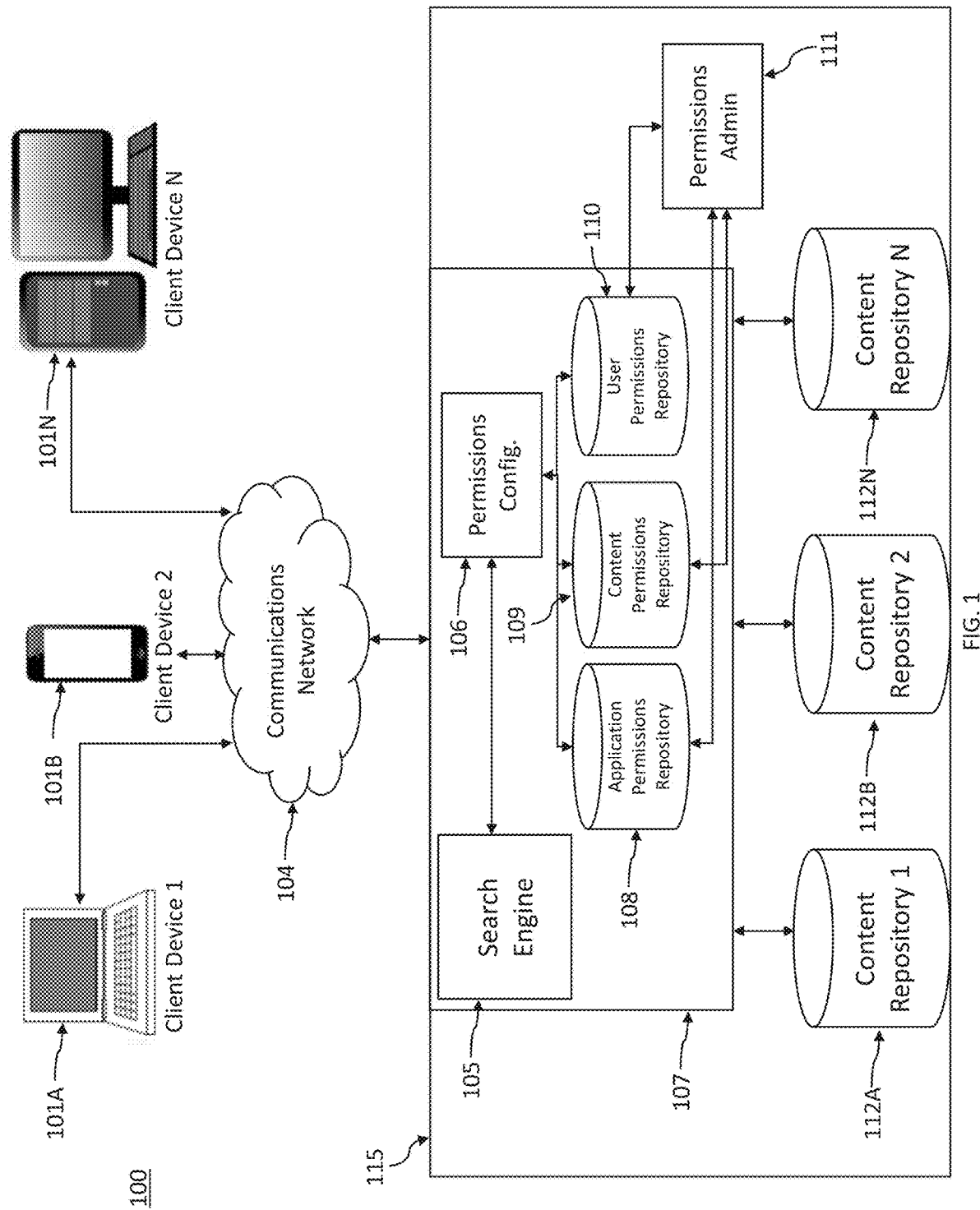
Figure 2:
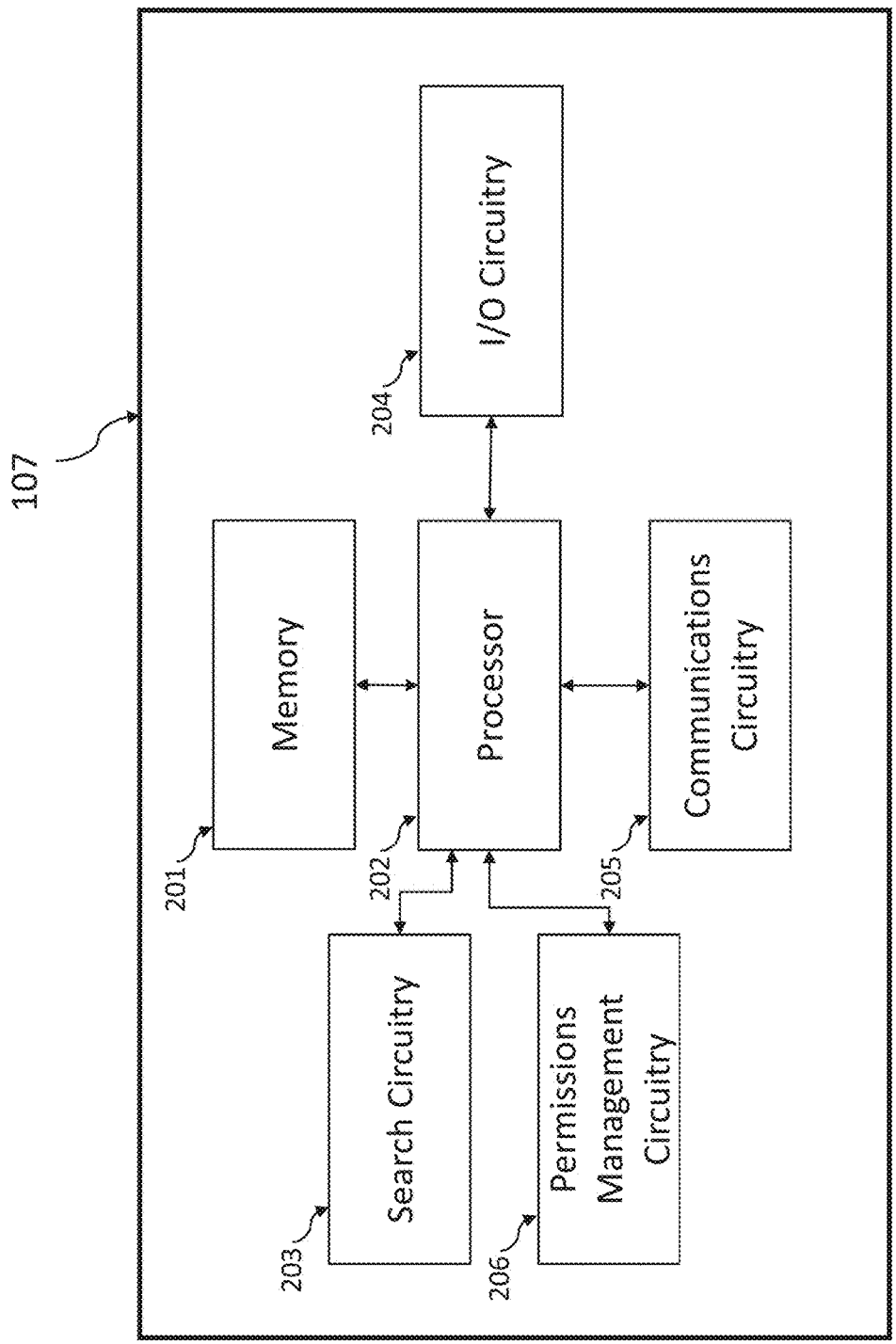
Figure 3A:
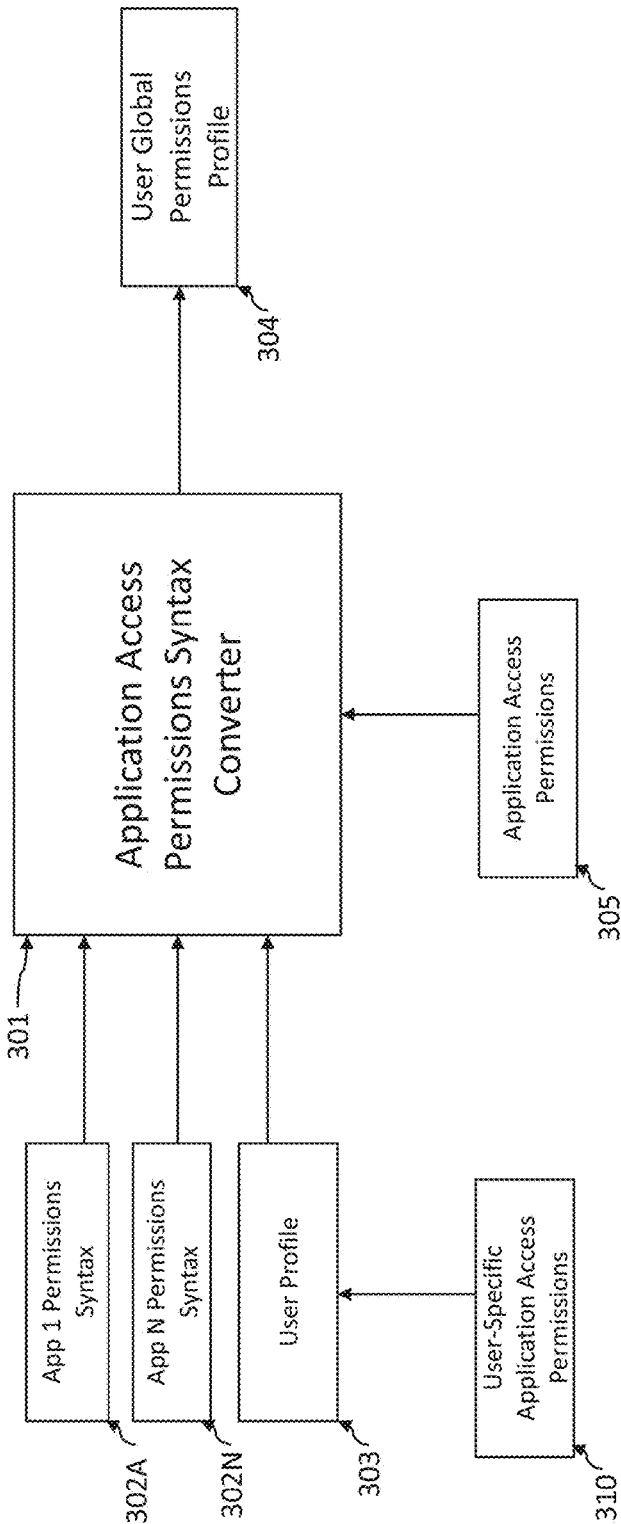
Figure 3B:
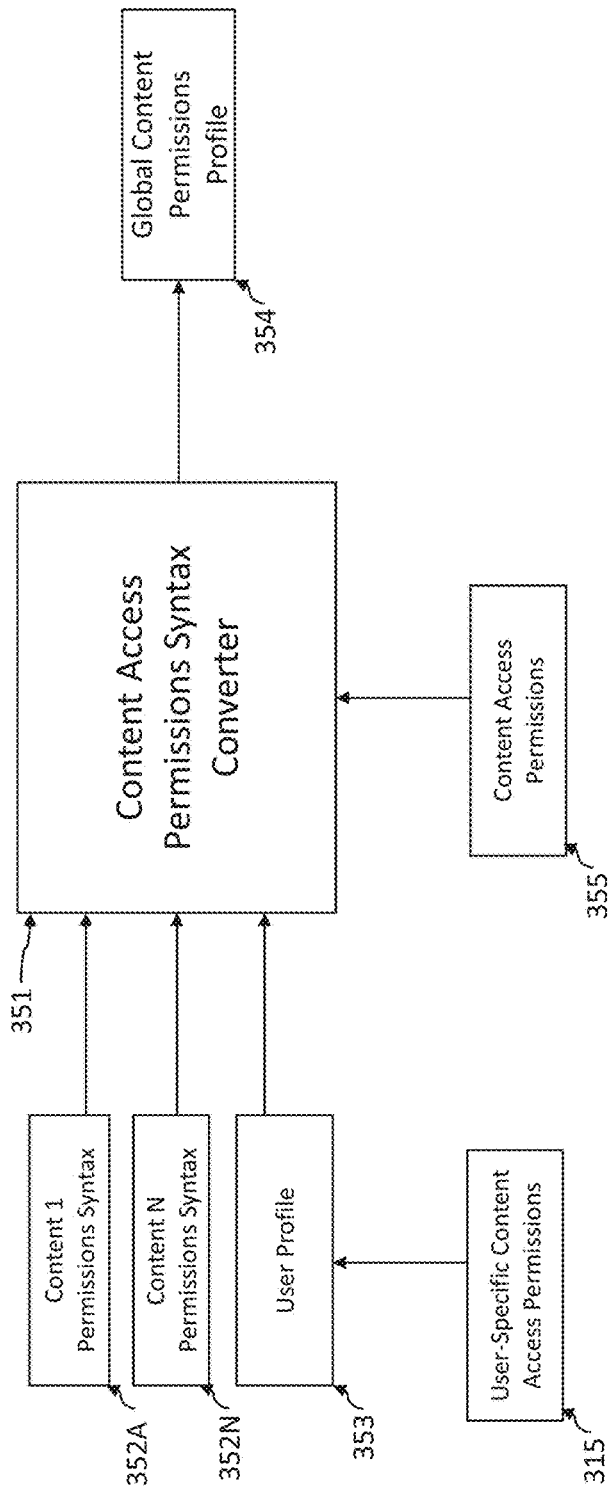
Figure 4:
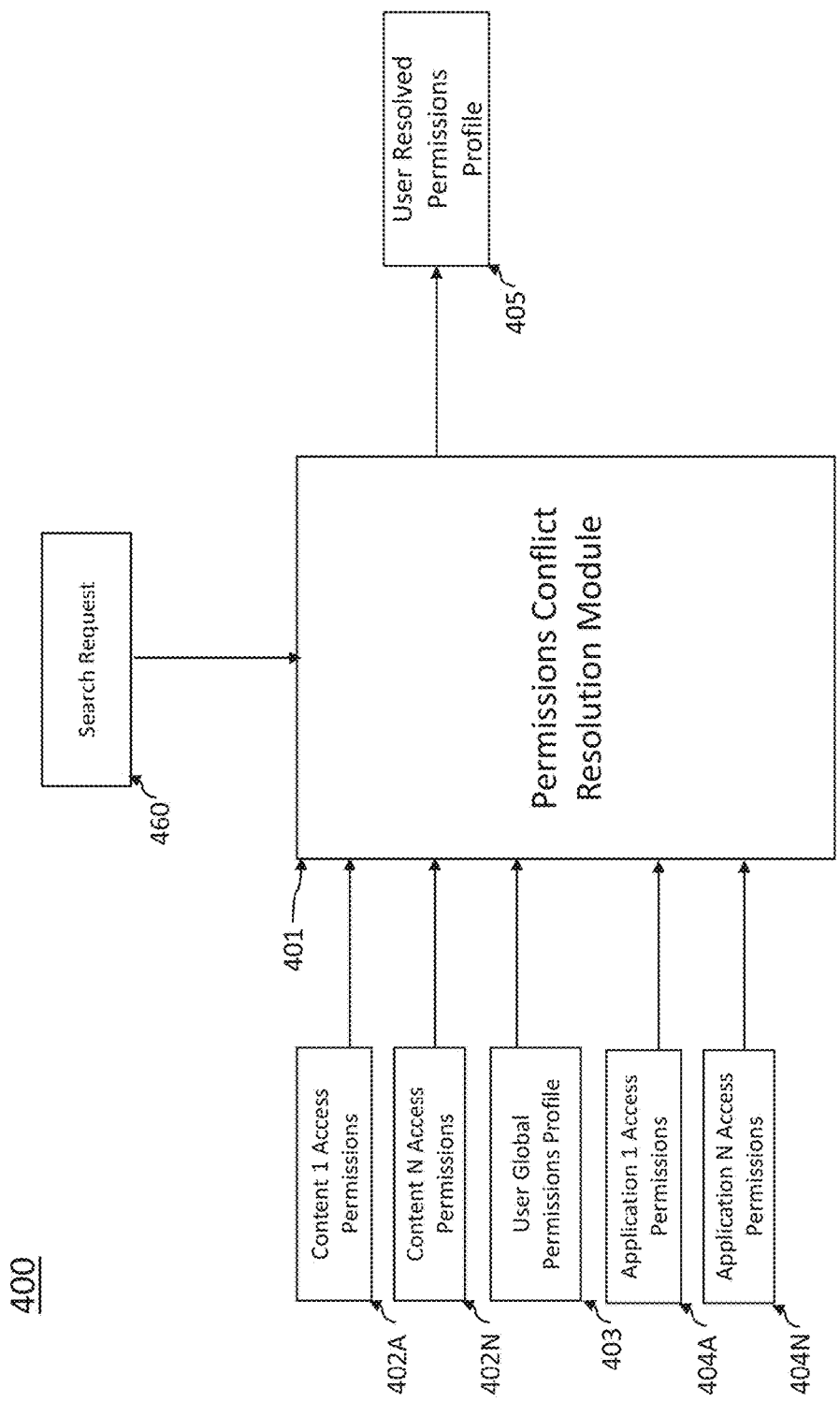
Figure 5:
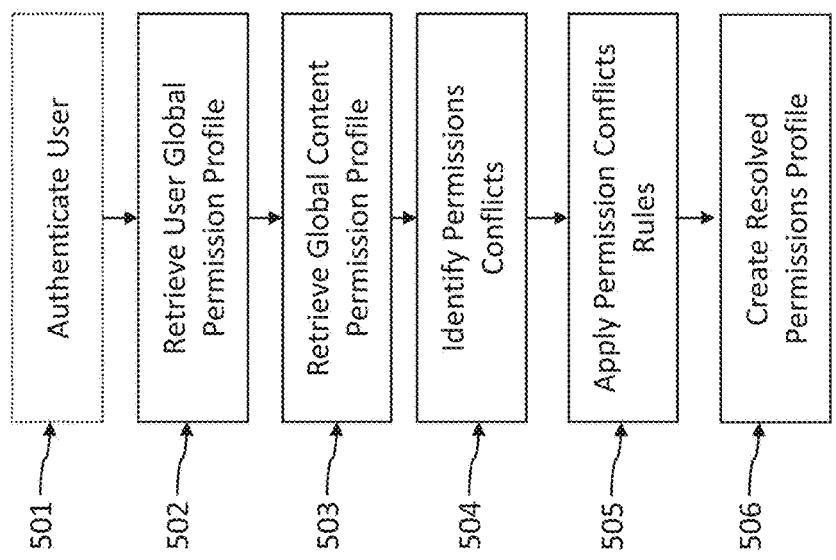
Figure 6:
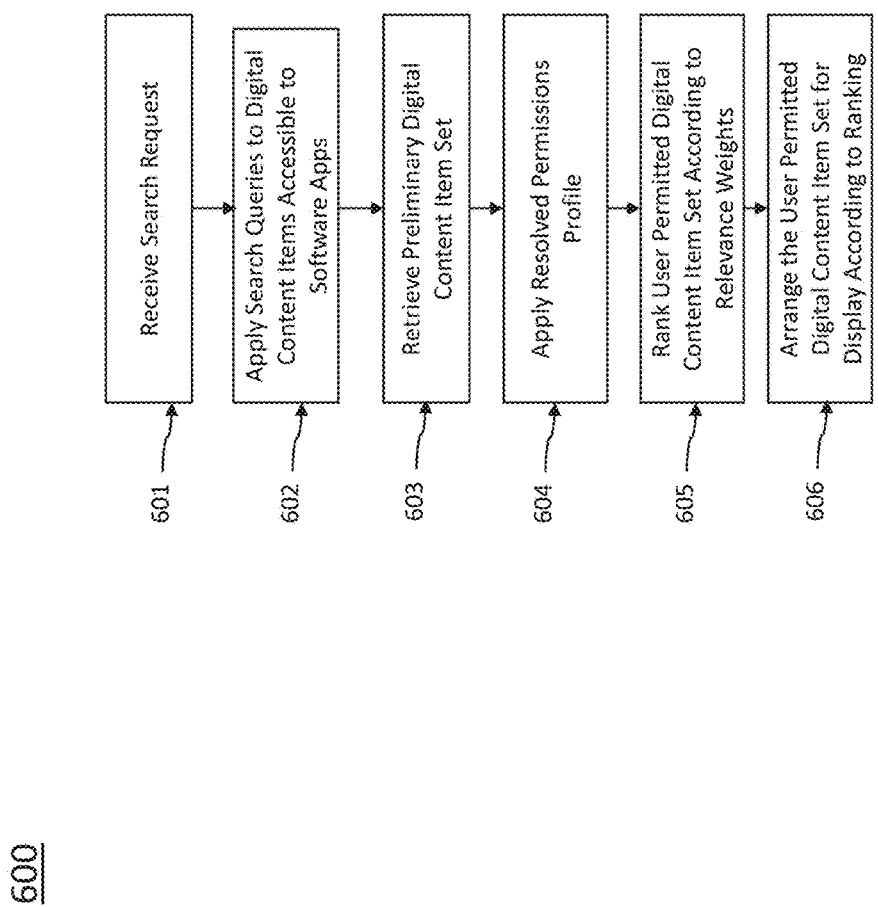
Figure 7A:
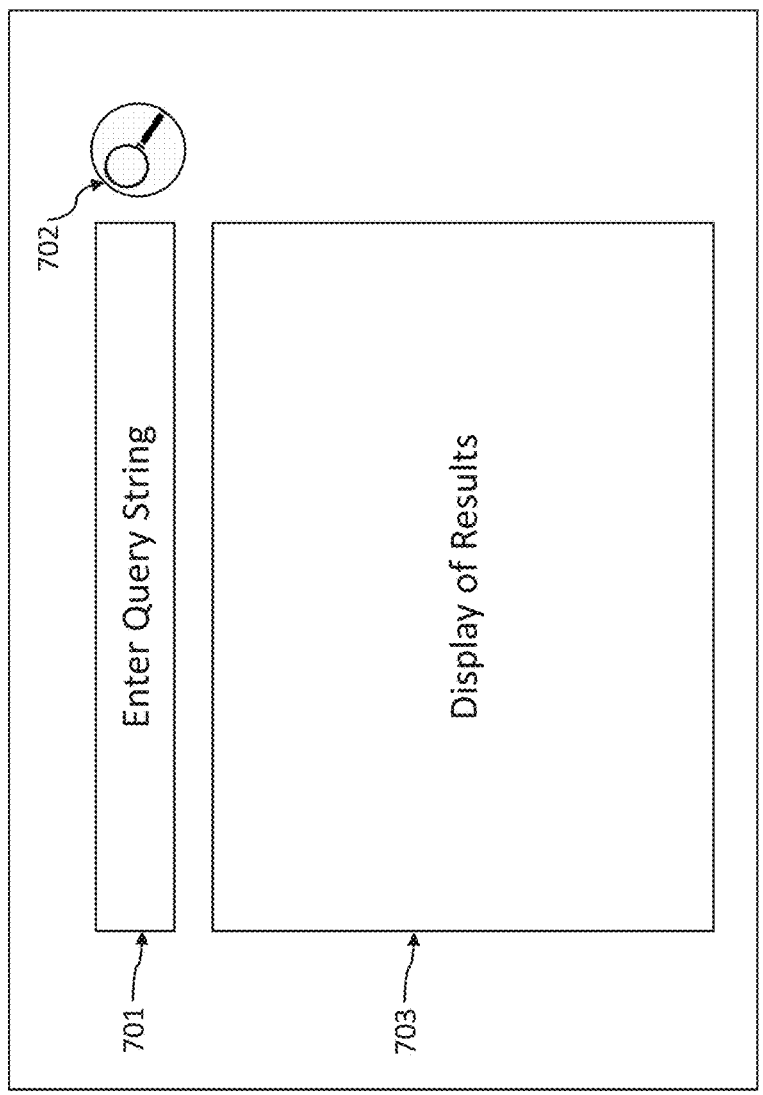
Figure 7B:
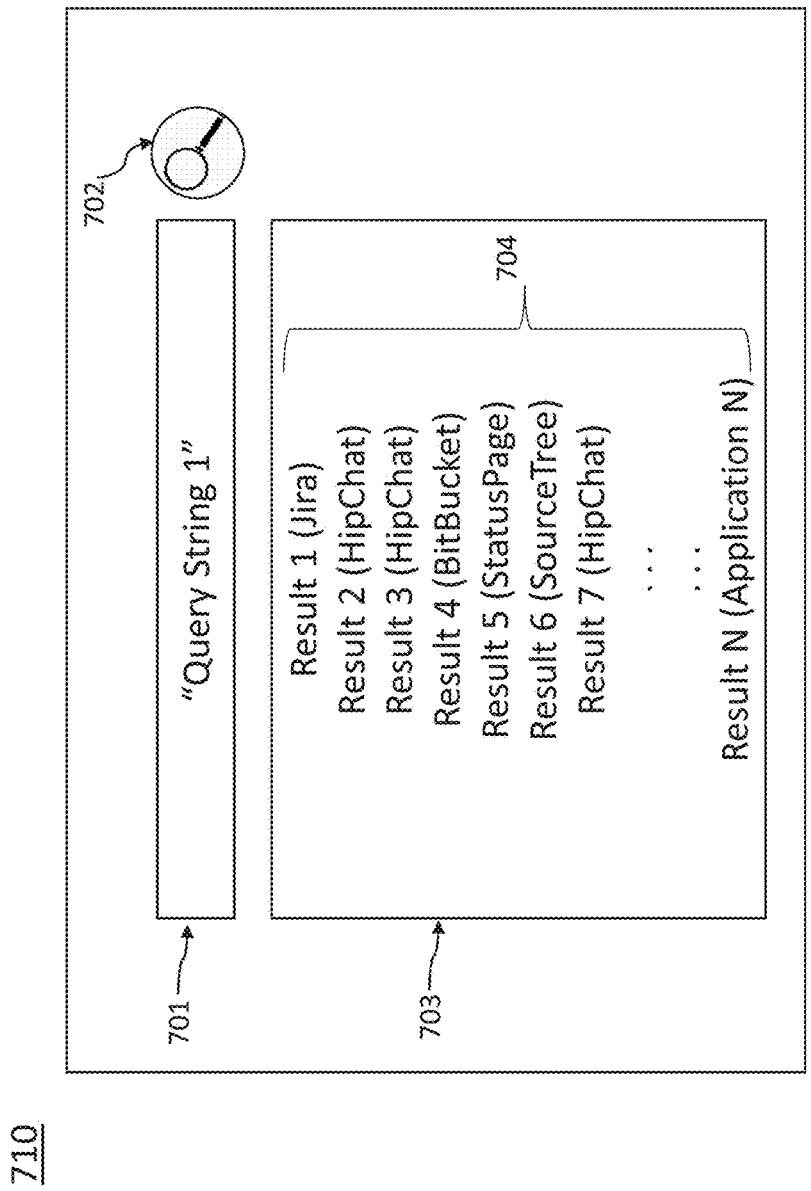
Figure 7C:
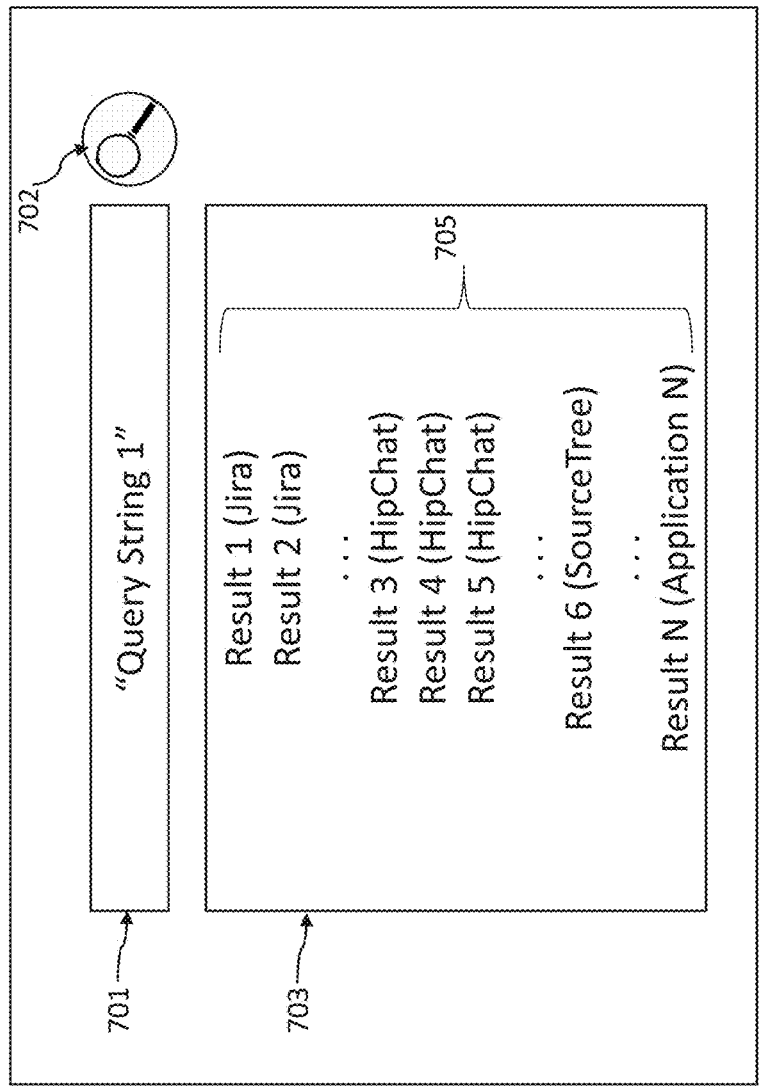

Having thus described the invention in general terms, reference will now be made to the accompanying drawings, which are not necessarily drawn to scale, and wherein:

FIG. 1 is a system architecture diagram of an enterprise platform system configured to practice embodiments of the present invention;

FIG. 2 is an exemplary schematic diagram of a computing entity according to one embodiment of the present invention;

FIG. 3A illustrates an exemplary application permissions syntax conversion data flow according to one embodiment of the present invention;

FIG. 3B illustrates an exemplary content permissions syntax conversion data flow according to one embodiment of the present invention;

FIG. 4 illustrates an exemplary permissions conflict resolution data flow according to one embodiment of the present invention;

FIG. 5 illustrates an exemplary permissions conflict resolution process according to one embodiment of the present invention;

FIG. 6 illustrates an exemplary process for completing a search query according to one embodiment of the present invention;

FIG. 7A illustrates an exemplary search interface for use with embodiments of the present invention;

FIG. 7B illustrates an exemplary search results interface for use with embodiments of the present invention; and FIG. 7C illustrates an exemplary search results interface for use with embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

Overview

Various embodiments of the invention generally relate to an enterprise platform that supports multiple software applications. Each of the software applications accommodates a plurality of user-based and content-based access permissions as well as application-based access permissions. Enterprise platform systems structured in accordance with various embodiments of the invention are further configured to support searching. For example, the methods, apparatus and computer program products described herein are operable to receive a search query from a user operating a client device and to return search results comprising a user-permitted digital content item set that is associated with multiple software applications but maintains defined access rights associated with the user and/or the digital content items retrieved in the search. The results are arranged for display to the user according to various rules.

A searchable enterprise platform may utilize a network and content repositories to provide a user with the ability to search for digital content items across the multiple software applications supported by the enterprise platform. Different users have differing access rights to digital content items associated with the different software applications. Each software application may have unique syntax rules associated with permissions, making polling of permissions data tedious or resource intensive for the enterprise platform. The inventors have identified that the system resources and time allocated to such searches are easily exhausted and compromised as a result of these challenges. The inventors have determined that the ability to normalize and aggregate permissions information across the searchable enterprise platform would reduce the computing resources and time necessary to perform enterprise-wide searches for digital content items.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "enterprise platform" or enterprise platform system refers to a computing service that is accessible via one or more computing devices and that is operable to provide access to a plurality of software applications related to business operations of an enterprise or company. In some examples, the enterprise platform may take the form of a central server disposed in communication with one or more additional servers running software applications, and having access to one or more databases storing digital content items and application related data and/or the like.

The term "software application" refers to a computer program designed to perform a group of coordinated functions, tasks, or activities for the benefit of a user or group of users. Examples of a software application may include an enterprise knowledge management and collaboration software (e.g., Confluence® by Atlassian, Trello® by Atlassian), an enterprise software project planning and tracking application (e.g., Jira® by Atlassian), a word processor, a spreadsheet, an accounting application, a web browser, a media player, a computer coding project collaboration engine (e.g., StatusPage® by Atlassian, Bitbucket® by Atlassian, SourceTree® by Atlassian, Bamboo® by Atlassian, Clover® by Atlassian, FishEye® by Atlassian, Crucible® by Atlassian), a scheduling engine, or an electronic networked messaging application (e.g., HipChat® by Atlassian). A software application may also refer to a collection of software applications. Software applications may be bundled for a computer and its system software or published separately, and may be coded as proprietary, or open source. Software applications may also be built for mobile platforms.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "digital content items" refers to any electronic media content item that is intended to be used in either an electronic form or as printed output and which is retrievable by or otherwise associated with any of the plurality of software applications that are accessible by the enterprise platform. A digital content item, for example, may be in the form of a stored document associated with a collaborative project within a software application. Other digital content items include images, audio files, video files, text files, and the like.

The term "user profile" refers to a collection of preferences, settings, configurations, client device identifiers, data, and information associated with a specific user. A profile refers therefore to the explicit digital representation of a person's identity and other data or information associated with the user. A user profile configured in accordance with the present invention is accessible by one or more of the software applications that are supported by the enterprise platform and, thus, may include application-specific preferences, settings, configurations, data, and information. In some embodiments, a user profile can be used to store a description of characteristics of the user and/or of the client device, as well as credentials and preferences of the user.

The term "application access permissions" refers to application specific configurations, settings, data, or indications of rights that allow individuals to access, use, create, and publish digital content accessible by the associated software application.

The term "content access permissions" refers to content specific configurations, settings, data, or indications of rights to access digital content items.

The term "user global permissions profile" refers to a user specific aggregation of normalized application access permissions for all software applications accessible by an enterprise platform.

The term "global content permissions profile" refers to a content specific aggregation of normalized content access permissions for each digital content item that is accessible to software applications supported by the enterprise platform.

The terms "normalized," "normalize," and "normalizing," refer to receiving data in one or more disparate formats and converting each of them into a single format for use with the present platform.

The term "permissions conflicts" refers to conflicts that may arise between application access permissions, content access permissions, and one or more search queries. For example, a user may not have permission to access a software application based on the application access permissions associated with the user. However, a given search query may produce search results that include digital content items (e.g., electronic documents) from the non-permitted software application.

The term "permissions conflict rules" refers to a set of operations, instructions, or algorithms for resolving permissions conflicts. For example, permissions conflict rules may include a hierarchy that is defined across permissions profiles that determines the weight to be applied to certain permissions relative to others in order to resolve permissions conflicts.

The term "resolved permissions profile" refers to configurations, settings, data, or indications of rights associated with a user and resulting from applying permissions conflict rules to resolve permissions conflicts between a user global permissions profile and a global content permissions profile in view of a specific search query. For example, a user global permissions profile may indicate that the user has access to any digital content item associated with a particular software application, while the global content permissions profile indicates that a specific digital content item associated with the particular software application should not be accessed by any user except for the system administrator for a period of time. Such a conflict is resolved by applying permissions conflict rules (i.e., more weight to one of the permissions profiles over the other).

The term "search request" refers to a query for electronic documents or digital content items submitted to an enterprise platform by a user utilizing a client device. The term "search results" refers to results returned from such a query. In some examples, a user using the client device may submit a query for "software project version 1.1" into an interface and the system may return a list of digital content items having keywords, metadata, or the like contained therein or associated therewith. The search results thus include the returned list of digital content items, all keywords and metadata associated therewith, and the arrangement or ranked order of the returned list.

The term "preliminary digital content item set" refers to a group of digital content items identified from a query resulting from a search request, where the group of digital content items is preliminary in that it has not been filtered, reduced, enhanced, or improved using the resolved permissions profile.

The term "user-permitted digital content item set" refers to a group of digital content items identified from a query resulting from a search request, where the group of digital content items has been filtered, reduced, enhanced, or improved using the resolved permissions profile. In this regard, the user-permitted digital content item set may represent a subset or modified version of the preliminary digital content item set.

The term "relevance weights" refers to a set of weighting rules or filters that are applied to each item of a user-permitted digital content item set. The rules or filter may be associated with permissions, relevance or access rights associated with an application, one or more digital content items, a user, and/or a group of users and the like. Applying relevance weights to the user-permitted digital content item set enables ranking and arranging of the items within the user-permitted digital content item set.

The term "permissions syntax" refers to a set of formats or instructions for the digital representation of permissions identifiers associated with a software application (i.e., application access permissions) and/or a digital content item (i.e., content access permissions) supported by the enterprise platform. For example, a first software application may represent permissions using a syntax of two singular bits representing read or write access (e.g., the two bit string "rw" having a value of "10" may represent affirmative read access and no write access). In contrast, a second software application may represent permissions using a syntax of two strings, as opposed to singular bits, to represent read or write access.

The term "digital content item creation timestamp" refers to an identification of network time associated with the creation of a digital content item. The digital content item creation timestamp can be assigned to or associated with a digital content item.

The term "digital content item access timestamp" refers to an identification of network time associated with the access of a digital content item. The digital content item access timestamp can be assigned to or associated with the digital content item.

The term "digital content item occurrence frequency" may refer to a count or number of times any digital content item is returned in a set of search query results. The term "digital content item occurrence frequency" may also refer to a count or number of times any digital content item exists enterprise-wide. The digital content item occurrence frequency may be associated with a software application, or may be an enterprise-wide count. For example, if a search query returns four digital content items that are associated with a first software application, the digital content item occurrence frequency for that digital content item for the first software application may be stored as an indication of four. The digital content item occurrence frequency may further be associated with a particular software application frequently ccessed by the user account performing the search query.

The term "real-time" may mean an occurrence that takes place in response to an event without contextually undue delay subsequent to the event.

It should be appreciated that the term "subset" describes a proper subset. A proper subset of set is portion of the set that is not equal to the set. For example, if elements A, B, and C belong to a first set, a subset including elements A and B is a proper subset of the first set. However, a subset including elements A, B, and C is not a proper subset of the first set.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system within which embodiments of the present invention may operate. Users may access a searchable enterprise platform 115 via a communications network 104 (e.g., the Internet, LAN, WAN, or the like) using client devices 101A-101N. The searchable enterprise platform 115 may comprise a server 107 in communication with one or more databases or repositories 108, 109, 110, 112A-112N.

The server 107 may be embodied as a computer or computers as known in the art. The server 107 may provide for receiving of electronic data from various sources, including but not necessarily limited to the client devices 101A-101N. For example, the server 107 may be operable to receive and process search requests provided by the client devices 101A-101N. The server 107 may facilitate the generation and providing of various search results comprising digital content items.

The databases or repositories 108-110 and 112A-112N may be embodied as a data storage device such as a Network Attached Storage (NAS) device or devices, or as a separate database server or servers. The databases 108-110 and 112A-112N include information accessed and stored by the server 107 to facilitate the operations of the searchable enterprise platform 115. For example, the databases 108-110 and 112A-112N may include, without limitation, user account credentials for users of the platform 115, user global permissions profiles, global content permissions profiles, application access permissions, content access permissions, user profiles, user resolved permissions profiles, permissions conflict rules, relevance weights, digital content items, and/or the like.

User permissions repository 110 may include a user profile for each user of the enterprise platform 115. The user profile includes application access permissions and content access permissions specific to the user. A user profile may be created upon registration by a user with the enterprise platform 115 and/or upon registration by the user with one or more software applications and added to user permissions repository 110.

User permissions repository 110 may further include a user global permissions profile. Each time a user accesses the enterprise platform 115, the user profile is retrieved so that the user global permissions profile can be created or modified. The user profile contains application access permissions and user-specific content access permissions, each having differing syntax rules. In some embodiments, the syntax for each access permission is normalized and added to the user global permissions profile, which is then stored in user permissions repository 110.

Content permissions repository 109 may include a global content permissions profile comprising content access permissions associated with digital content items that are accessible by the enterprise platform 115. The content access permissions may not be user or software application specific. A global content permissions profile may be created upon creation of a digital content item or at any time by a permissions administrator 111 and added to the content permissions repository 109. Global content permissions profiles stored in content permissions repository 109 may also be retrieved and modified by a permissions administrator 111.

Application permissions repository 108 may include application access permissions specific to software applications that are supported by the enterprise platform 115. The application access permissions may not be user or digital content item specific. Application access permissions may be created upon installation of a software application to the enterprise platform 115 (or networked device) or at any time by a permissions administrator 111 and added to application permissions repository 108. Application access permissions stored in the application permissions repository 108 may also be retrieved and modified by the permissions administrator 111.

Content repositories 112A-N may include digital content items associated with software applications supported by the enterprise platform 115. Upon creation or editing, each digital content item is indexed for search according to various metadata associated with the digital content item. Indexing may also be based on text or other electronic data contained within or associated with the digital content item.

The client devices 101A-101N may be any computing device as defined above. Electronic data received by the server 107 from the client devices 101A-101N may be provided in various forms and via various methods. For example, the client devices 101A-101N may include desktop computers, laptop computers, smartphones, netbooks, tablet computers, wearables, and the like.

In embodiments where a client device 101A-101N is a mobile device, such as a smart phone or tablet, the client device 101A-101N may execute an "app" to interact with the searchable enterprise platform 115. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. It will be appreciated that a mobile device may also execute a browser to interact with the searchable enterprise platform 115 (i.e., outside of the context of an "app").

Additionally or alternatively, the client device 101A-101N may interact with the searchable enterprise platform 115 via a web browser. As yet another example, the client device 101A-101N may include various hardware or firmware designed to interface with the searchable enterprise platform 115.

An example of a data flow for exchanging electronic information among one or more client devices 101A-101N and the searchable enterprise platform 115 is described below.

In the depicted embodiment, the one or more client devices 101A-101N are configured to generate a search request that is intended to produce search results. The search request is transmitted by wired or wireless communication over the communications network 104 to the searchable enterprise platform 115. In the depicted embodiment, the search request is provided to the search engine 105 of the server 107.

The server 107 utilizes search engine 105 to perform searches or queries based on the search request. The return and display of search results are governed by a permissions configuration module 106 that resolves permissions conflicts between user permissions, content permissions, and applications permissions. Permissions configuration module 106 receives a user global permissions profile and a global content permission profile, applies permissions conflict rules and produces a user resolved permissions profile for storage in the user permissions repository 110 and for use in determining a user-permitted digital content item set. Permissions configuration module 106 may further apply relevance weights to the user-permitted digital content item set such that the user-permitted digital content item set may be ranked and ordered for display in an interface rendered by one or more of the client devices 101A-101N.

It will be appreciated that repositories 108-110 may be one or more repositories, and may be part of or separate from server 107. As discussed above, a permissions administrator 111 may control assignment of permissions information (e.g., application access permissions, content access permissions, user access permissions, global content permissions profiles, user global permissions profiles, permissions conflicts rules, relevance weights, etc.) stored in repositories 108-110. It will be appreciated that a permissions administrator 111 can be one or more of a content creator or a site administrator.

Example Apparatus for Implementing Embodiments of the Present Invention

The server 107 may be embodied by one or more computing systems, such as apparatus 200 shown in FIG. 2. The apparatus 200 may include a processor 202, a memory 201, input/output circuitry 204, communications circuitry 205, search circuitry 203, and permissions management circuitry 206. The apparatus 200 may be configured to execute the operations described above with respect to FIG. 1 and below with respect to FIGS. 3-6. Although these components 201-206 are described with respect to functional limitations, it should be understood that the particular implementations necessarily include the use of particular hardware. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 201 may provide storage functionality, the communications circuitry 205 may provide network interface functionality, and the like.

In some embodiments, the processor 202 (and/or co-processor or any other processing circuitry assisting or otherwise associated with the processor) may be in communication with the memory 201 via a bus for passing information among components of the apparatus. The memory 201 may be non-transitory and may include, for example, one or more volatile and/or non-volatile memories. In other words, for example, the memory may be an electronic storage device (e.g., a computer readable storage medium).

The memory 201 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 201 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display and may comprise a web user interface, a mobile application, a client device, a kiosk, or the like. In some embodiments, the input/output circuitry 204 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 205 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 205 may include, for example, a network interface for enabling communications with a wired or wireless communication network. For example, the communications circuitry 205 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Search circuitry 203 includes hardware configured to receive search requests and to perform search queries based on such search requests. The search circuitry 203 may utilize processing circuitry, such as the processor 202, to perform these actions. The search circuitry 203 may send and/or receive data from permissions management circuitry 206. In some implementations, the sent and/or received data may be data identifying access permissions associated with one or more users and their rights to access digital content items and/or software applications. It should also be appreciated that, in some embodiments, the search circuitry 203 may include a separate processor, specially configured field programmable gate array (FPGA), or application specific interface circuit (ASIC). In some implementations, permissions management circuitry 206, described below, may be sub-circuitry belonging to search circuitry 203. The search circuitry 203 may be implemented using hardware components of the apparatus configured by either hardware or software for implementing the functions described herein.

Permissions management circuitry 206 includes hardware configured to manage permissions for one or more users with respect to access to digital content items and/or software applications. The permissions management circuitry may utilize processing circuitry, such as the processor 202, to perform these actions. However, it should also be appreciated that, in some embodiments, the permissions management circuitry may include a separate processor, specially configured field programmable gate array (FPGA), or application specific interface circuit (ASIC) for performing the functions described herein. Circuitry 206 may be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor or other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Managing Access Permissions

FIG. 3A illustrates an exemplary application access permissions syntax conversion data flow 300. Software applications 1-N may have differing permissions syntax rules for representing application access permissions. Application access permissions syntax converter 301 takes as inputs: the application permissions syntax rules 302A-302N, the user profile 303, and application access permissions 305. Notably, the depicted user profile 303 includes one or more user-specific application access permissions 310. The depicted application access permissions 305 are not specific to a given user and thus are not associated with a selected user profile 303.

Application access permissions syntax converter 301 normalizes the application access permissions 305 and the user-specific application access permissions 310 in view of the application permissions syntax rules 302A-302N and outputs a user global permissions profile 304.

FIG. 3B illustrates an exemplary content access permissions syntax conversion data flow 350. Software applications 1-N may have differing permissions syntax rules for representing content access permissions. Content access permissions syntax converter 351 takes as inputs: the context permissions syntax rules 352A-352N, the user profile 353, and content access permissions 355. Notably, the depicted user profile 353 includes one or more user-specific content access permissions 315. The depicted content access permissions 355 are not specific to a given user and thus are not associated with a selected user profile 353.

Content access permissions syntax converter 351 normalizes the content access permissions 355 and the user-specific application access permissions 315 in view of the application permissions syntax rules 352A-352N and outputs a global content permissions profile 354.

FIG. 4 illustrates an exemplary permissions conflict resolution data flow 400. Digital content items 1-N may each have different content access permissions associated with them, while information contained within a user global permissions profile 403 may conflict with those content access permissions. Similarly, applications 1-N may have different application access permissions associated with them, while information contained within a global content permissions profile may conflict with those application access permissions. Permissions conflict resolution module 401 takes as input the following: a search request 460, content access permissions 402A-402N for digital content items 1-N, the user global permissions profile 403, and application access permissions 404A-404N for software applications 1-N. In some embodiments, permissions conflict resolution module 401 takes as input a search request 460, a global content permissions profile (as depicted in FIG. 3B above), and the user global permissions profile 403. The permissions conflict resolution module 401 identifies permission conflicts between application access permissions 404A-404N, content access permissions 402A-402N, and the user initiated search request 460. The permissions conflict resolution module 401 applies permissions conflict rules to the identified permissions conflicts to produce a resolved permissions profile 405.

FIG. 5 is a flow chart of an example process 500 for resolving permissions conflicts. The depicted process 500 may be performed by the example permissions conflict resolution module 401 shown in FIG. 4. The process 500 begins, optionally, by authenticating a user 501 upon receiving user identifier information associated with a search request perhaps through a user profile. In some implementations, the user identifier information may include a user ID or login credentials such as a user name and password.

The process 500 continues by retrieving a user global permissions profile 502 associated with the search request and/or the authenticated user. The user global permissions profile may be created according to the data flow depicted in FIG. 3A. The process 500 continues by retrieving global content permissions profile 503. The global content permissions profile may be created according to the data flow depicted in FIG. 3B. The process 500 continues by identifying permissions conflicts 504 between application access permissions of the user global permission profile, content access permissions of the global content permissions profile, and the user imitated search request. The depicted process 500 continues by applying permissions conflicts rules 505 to resolve the identified permission conflicts and ends by creating a resolved permissions profile 506.

FIG. 6 is a flow chart of an example process 600 for retrieving and arranging search results in a searchable enterprise platform. The process 600 begins by receiving a search request 601 from a network connected client device. The search request includes one or more queries comprised of one or more words, numbers, letters, or other supported characters and/or strings. The search queries embodiment by the search request are intended to encompass all digital content items and software applications that are accessible or otherwise supported by the enterprise platform.

The process 600 continues by applying the search queries 602 to indexed digital content items that are accessible to one or more software applications and digital content repositories supported by the enterprise platform.

The process 600 continues by with retrieving a preliminary digital content item set 603 that includes all digital content items that are relevant to the search requested based on the applied search queries. A user resolved permissions profile is then applied to the preliminary digital content set 604 to produce a user-permitted digital content set. Relevance weights are applied to the user-permitted digital content set 605 so that the user-permitted digital content set can be ranked. The user-permitted digital content set is then arranged for display according to the ranking 606.

FIGS. 7A-7C illustrate exemplary search interfaces for use with embodiments of the present invention. An exemplary interface 700 comprises an input section 701 where a user can enter a query string for searching across the enterprise platform. A search selection button 702 may be displayed on the interface 700, and a user may indicate entry of the query string by other means such at pressing the "Enter" key on the keyboard. A display section 703 is available for display of search results.

Exemplary interface 710 includes search results 1-N 704 that are ranked according to the methods described herein. It will be appreciated that ranked results 704 are ranked according to a method that does not group digital content items according to the software application with which they are associated.

Exemplary interface 720 includes search results 1-N 705 that are ranked according to the methods described herein. It will be appreciated that ranked results 705 are ranked according to a method that groups digital content items according to the software application with which they are associated.

It will be appreciated that search results may be arranged for display at a client device according to a multitude of rules. For example, search results may be arranged according to comparisons between timestamps associated with each digital content item. The timestamps may be compared to timestamps of other digital content items, timestamps associated with a user (e.g., when the user joined the enterprise system; the last time the user logged into the system; etc.), timestamps associated with access to the digital content items, relevancy to the user or search string, among various others.

Additional Implementation Details

Although an example processing system has been described in FIG. 2, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for managing access permissions for a searchable enterprise platform comprising a plurality of software applications, the apparatus comprising at least one processor and at least one memory including computer program code, the at least one memory and the computer program code configured to, with the at least one processor, cause the apparatus to:
receive a search request from a client device associated with a user profile;
retrieve a user global permissions profile associated with the user profile, the user global permissions profile comprising application access permissions assigned to the user profile for the plurality of software applications;
retrieve a global content permissions profile, the global content permissions profile comprising content access permissions assigned to digital content items that are retrievable by one or more of the plurality of software applications;
apply permissions conflict rules to resolve permissions conflicts between the user global permissions profile and the global content permissions profile to produce a resolved permissions profile;
retrieve search results comprising a preliminary digital content item set that is associated with the plurality of software applications;
apply the resolved permissions profile to the search results to produce a user-permitted digital content item set;
output the user-permitted digital content set to the client device associated with the user profile.

2. The apparatus of claim 1, wherein outputting the user-permitted digital content set to the client device associated with the user profile comprises:
applying relevance weights to each digital content item of the user-permitted digital content item set, the relevance weights based on the resolved permissions profile;
ranking each digital content item of the user-permitted digital content item set according to the applied relevance weights;
arranging the user-permitted digital content item set according to the ranking; and
transmitting the user-permitted digital content item set to the client device associated with the user profile.

3. The apparatus of claim 2, wherein the user-permitted digital content set is further arranged according to a digital content item creation timestamp in relation to a defined network time.

4. The apparatus of claim 2, wherein the user-permitted digital content set is further arranged according to a digital content item occurrence frequency.

5. The apparatus of claim 1, wherein the user global permissions profile is created at least by normalizing application permissions syntax for each software application of the plurality of software applications.

6. The apparatus of claim 1, wherein the resolved permissions profile further includes resolving conflicts arising from application permissions for each software application of the plurality of software applications.

7. The apparatus of claim 1, wherein one or more of the user global permissions profile and the global content permissions profile are updated in real-time.

8. The apparatus of claim 2, wherein the user-permitted digital content set is further arranged according to a digital content item access timestamp.

9. The apparatus of claim 4, wherein the digital content item occurrence frequency is associated with a first software application.

10. A system for managing access permissions for a searchable enterprise platform comprising a plurality of software applications, the system comprising a server in communication with a network, the server comprising at least one processor and at least one memory including computer program code, the at least one memory and the computer program code configured to, with the at least one processor, cause the server to:
receive a search request from a client device associated with a user profile;
retrieve a user global permissions profile associated with the user profile, the user global permissions profile comprising application access permissions assigned to the user profile for the plurality of software applications;
retrieve a global content permissions profile, the global content permissions profile comprising content access permissions assigned to digital content items that are retrievable by one or more of the plurality of software applications;
apply permissions conflict rules to resolve permissions conflicts between the user global permissions profile and the global content permissions profile to produce a resolved permissions profile;
retrieve search results comprising a preliminary digital content item set that is associated with the plurality of software applications;
apply the resolved permissions profile to the search results to produce a user-permitted digital content item set;
output the user-permitted digital content set to the client device associated with the user profile.

11. The system of claim 10, wherein outputting the user-permitted digital content set to the client device associated with the user profile comprises:
applying relevance weights to each digital content item of the user-permitted digital content item set, the relevance weights based on the resolved permissions profile;
ranking each digital content item of the user-permitted digital content item set according to the applied relevance weights;
arranging the user-permitted digital content item set according to the ranking; and
transmitting the user-permitted digital content item set to the client device associated with the user profile.

12. The system of claim 11, wherein the user-permitted digital content set is further arranged according to a digital content item creation timestamp in relation to a defined network time.

13. The system of claim 11, wherein the user-permitted digital content set is further arranged according to a digital content item occurrence frequency.

14. The system of claim 10, wherein the user global permissions profile is created at least by normalizing application permissions syntax for each software application of the plurality of software applications.

15. The system of claim 10, wherein the resolved permissions profile further includes resolving conflicts arising from application permissions for each software application of the plurality of software applications.

16. The system of claim 10, wherein one or more of the user global permissions profile and the global content permissions profile are updated in real-time.

17. The system of claim 11, wherein the user-permitted digital content set is further arranged according to a digital content item access timestamp.

18. The system of claim 13, wherein the digital content item occurrence frequency is associated with a first software application.

19. The system of claim 11, wherein the user-permitted digital content set is further arranged according to a scoring algorithm.

* * * * *